(12) United States Patent
Schoenfelder et al.

(10) Patent No.: US 11,860,433 B2
(45) Date of Patent: Jan. 2, 2024

(54) OPTICAL SPLICE AND TERMINATION MODULE

(71) Applicant: COMMSCOPE TECHNOLOGIES LLC, Hickory, NC (US)

(72) Inventors: Rodney C. Schoenfelder, Shakopee, MN (US); David J. Johnsen, Plymouth, MN (US); Matthew J. Holmberg, Carver, MN (US); Jackson Ray Pomroy, Minnetonka, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 3 days.

(21) Appl. No.: 17/849,041

(22) Filed: Jun. 24, 2022

(65) Prior Publication Data
US 2023/0009611 A1    Jan. 12, 2023

Related U.S. Application Data

(63) Continuation of application No. 16/603,098, filed as application No. PCT/US2018/026069 on Apr. 4, 2018, now Pat. No. 11,372,186.

(60) Provisional application No. 62/481,397, filed on Apr. 4, 2017.

(51) Int. Cl.
*G02B 6/44* (2006.01)

(52) U.S. Cl.
CPC ......... *G02B 6/4454* (2013.01); *G02B 6/4457* (2013.01); *G02B 6/4478* (2013.01)

(58) Field of Classification Search
CPC ... G02B 6/4454; G02B 6/4457; G02B 6/4478
USPC ....................................................... 385/135
See application file for complete search history.

(56) References Cited

U.S. PATENT DOCUMENTS

| | | | |
|---|---|---|---|
| 4,840,449 A | 6/1989 | Ghandeharizadeh | |
| 5,067,784 A | 11/1991 | Debortoli et al. | |
| 5,071,211 A | 12/1991 | Debortoli et al. | |
| 5,127,082 A | 6/1992 | Below et al. | |
| 5,138,688 A | 8/1992 | Debortoli | |

(Continued)

FOREIGN PATENT DOCUMENTS

| | | |
|---|---|---|
| CA | 2 029 592 A1 | 5/1992 |
| CN | 102792204 A | 11/2012 |

(Continued)

OTHER PUBLICATIONS

International Search Report and Written Opinion of the International Searching Authority for International Patent Application No. PCT/US2018/026069 dated Jul. 23, 2018, 11 pages.

(Continued)

*Primary Examiner* — Jerry M Blevins
(74) *Attorney, Agent, or Firm* — Merchant & Gould P.C.

(57) ABSTRACT

An optical module includes a housing; an optical adapter arrangement disposed at the housing; a cable inlet leading from an exterior of the housing to the interior of the housing; and a splice location disposed within the interior of the housing. Optical pigtails extend from the optical adapter arrangement to the splice location. Certain types of modules have a removable splice tray having a bend radius limiting arrangement surrounding multiple splice channels. Certain types of modules have first and second chambers separated by a wall defining a pass-through aperture.

20 Claims, 13 Drawing Sheets

(56) References Cited

U.S. PATENT DOCUMENTS

| | | |
|---|---|---|
| 5,204,929 A | 4/1993 | Machall et al. |
| 5,231,687 A | 7/1993 | Handley |
| 5,235,665 A | 8/1993 | Marchesi et al. |
| 5,265,187 A | 11/1993 | Morin et al. |
| 5,337,400 A | 8/1994 | Morin et al. |
| 5,353,367 A | 10/1994 | Czosnowski et al. |
| 5,363,467 A | 11/1994 | Keith |
| 5,402,515 A | 3/1995 | Vidacovich et al. |
| 5,412,751 A | 5/1995 | Siemon et al. |
| 5,835,657 A | 11/1998 | Suarez et al. |
| 5,975,769 A | 11/1999 | Larson et al. |
| 6,360,050 B1 | 3/2002 | Moua et al. |
| 6,427,035 B1 | 7/2002 | Mahony |
| 6,542,652 B1 | 4/2003 | Mahony |
| 6,591,053 B2 | 7/2003 | Fritz |
| 6,621,975 B2 | 9/2003 | Laporte et al. |
| 6,668,127 B1 | 12/2003 | Mahony |
| 6,768,860 B2 | 7/2004 | Liberty |
| 6,802,724 B1 | 10/2004 | Mahony |
| 6,925,241 B2 | 8/2005 | Bohle et al. |
| 6,944,389 B2 | 9/2005 | Giraud et al. |
| 7,006,748 B2 | 2/2006 | Dagley et al. |
| 7,013,074 B2 | 3/2006 | Battey et al. |
| 7,120,347 B2 | 10/2006 | Blackwell, Jr. et al. |
| 7,218,828 B2 | 5/2007 | Feustel et al. |
| 7,333,708 B2 | 2/2008 | Blackwell, Jr. et al. |
| 7,653,282 B2 | 1/2010 | Blackwell, Jr. et al. |
| 7,751,674 B2 | 7/2010 | Hill |
| 7,822,310 B2 | 10/2010 | Castonguay et al. |
| 7,856,166 B2 | 12/2010 | Biribuze et al. |
| 7,869,681 B2 | 1/2011 | Battey et al. |
| 7,889,961 B2 | 2/2011 | Cote et al. |
| 7,945,135 B2 | 5/2011 | Cooke et al. |
| 7,945,138 B2 | 5/2011 | Hill et al. |
| 7,961,999 B2 | 6/2011 | Frohlich et al. |
| 8,059,932 B2 | 11/2011 | Hill et al. |
| 8,184,938 B2 | 5/2012 | Cooke et al. |
| 8,280,216 B2 | 10/2012 | Cooke et al. |
| 8,326,107 B2 | 12/2012 | Cooke et al. |
| 8,374,477 B2 | 2/2013 | Hill |
| 8,385,711 B2 | 2/2013 | Fabrykowski et al. |
| 8,433,171 B2 | 4/2013 | Cooke et al. |
| 8,452,148 B2 | 5/2013 | Cooke et al. |
| 8,467,651 B2 | 6/2013 | Cao et al. |
| 8,538,226 B2 | 9/2013 | Makrides-Saravanos et al. |
| 8,660,397 B2 | 2/2014 | Giraud et al. |
| 8,712,206 B2 | 4/2014 | Cooke et al. |
| 8,879,882 B2 | 11/2014 | Conner et al. |
| 8,886,003 B2 | 11/2014 | Nieves et al. |
| 8,953,924 B2 | 2/2015 | Cote et al. |
| 8,985,862 B2 | 3/2015 | Cote et al. |
| 8,989,547 B2 | 3/2015 | Brower et al. |
| 9,020,320 B2 | 4/2015 | Cooke et al. |
| 9,049,500 B2 | 6/2015 | Conner et al. |
| 9,069,150 B2 | 6/2015 | Solheid et al. |
| 9,116,324 B2 | 8/2015 | Cooke et al. |
| 9,134,497 B2 | 9/2015 | Guzzo et al. |
| 9,207,421 B2 | 12/2015 | Conner |
| 9,213,161 B2 | 12/2015 | Cote et al. |
| 9,250,409 B2 | 2/2016 | Blackwell, Jr. et al. |
| 9,279,951 B2 | 3/2016 | McGranahan et al. |
| 9,383,538 B2 | 7/2016 | Giraud et al. |
| 9,442,265 B2 | 9/2016 | Hill et al. |
| 10,012,814 B2 | 7/2018 | Hill et al. |
| 11,372,186 B2 * | 6/2022 | Schoenfelder ....... G02B 6/4478 |
| 2002/0191939 A1 | 12/2002 | Daoud et al. |
| 2003/0113086 A1 | 6/2003 | Jun et al. |
| 2006/0098931 A1 | 5/2006 | Sibley et al. |
| 2010/0322582 A1 | 12/2010 | Cooke et al. |
| 2010/0322583 A1 | 12/2010 | Cooke et al. |
| 2011/0206334 A1 | 8/2011 | Liu et al. |
| 2012/0134639 A1 | 5/2012 | Giraud et al. |
| 2013/0148936 A1 * | 6/2013 | Hill ..................... G02B 6/4454 385/135 |
| 2013/0243386 A1 | 9/2013 | Pimentel et al. |
| 2013/0308916 A1 | 11/2013 | Buff et al. |
| 2014/0086545 A1 | 3/2014 | Solheid et al. |
| 2015/0268436 A1 | 9/2015 | Blackwell, Jr. et al. |
| 2016/0097907 A1 | 4/2016 | Hill et al. |
| 2016/0116697 A1 * | 4/2016 | Kostecka ............. G02B 6/4455 385/135 |
| 2018/0306998 A1 | 10/2018 | Hill et al. |

FOREIGN PATENT DOCUMENTS

| | | |
|---|---|---|
| DE | 27 35 106 A1 | 2/1979 |
| DE | 35 32 314 A1 | 3/1987 |
| DE | 40 30 301 A1 | 3/1992 |
| EP | 0 281 196 A2 | 9/1988 |
| EP | 0 408 266 A2 | 1/1991 |
| EP | D 474 091 A1 | 3/1992 |
| EP | 0 529 830 A1 | 3/1993 |
| GB | 2 369 196 A | 5/2002 |
| JP | 2000-241631 A | 9/2000 |
| JP | 3989853 B2 | 10/2007 |
| WO | 91/05281 A1 | 4/1991 |
| WO | 2010/077856 A1 | 7/2010 |

OTHER PUBLICATIONS

Extended European Search Report for European Patent Application No. 18781696.2 dated Nov. 19, 2020, 8 pages.
Poli-MOD® Patch and Splice Module, AFL Global, 2 pages (2013).
EDGE™ Splice Cassette, 12F, LC duplex, OM4, single-fiber, Corning, 3 pages (2016).
RDS 118 Splice Cartridge, Fiber Management, Realm Communications Group, Inc., 1 pg (Admitted Prior Art as of Apr. 4, 2017).
Ianos LC splicing modules, Huber+Suhner Data Cener, 2 pages (Admitted Prior Art as of Apr. 4, 2017).
HD Flex LC Splice Cassette and Fiber Adapter Panel (FAP), Panduit Corp, 3 pages (2015).

* cited by examiner

OPTICAL SPLICE AND TERMINATION MODULE

CROSS-REFERENCE TO RELATED APPLICATION

This application is a Continuation of U.S. patent application Ser. No. 16/603,098, filed on Oct. 4, 2019, now U.S. Pat. No. 11,372,186; which is a National Stage Application of PCT/US2018/026069, filed on Apr. 4, 2018; which claims the benefit of U.S. Patent Application Ser. No. 62/481,397, filed on Apr. 4, 2017, the disclosures of which are incorporated herein by reference in their entireties. To the extent appropriate, a claim of priority is made to each of the above disclosed applications.

BACKGROUND

In fiber optic telecommunications systems, it is common for optical fibers of transmission cables to be split into multiple strands. Further, when such systems are installed, it is known to provide excess capacity in the installations to support future growth and utilization of the fibers. Often in these installations, modules including splitters or multiplexers may be used to provide the connection between transmission fibers and customer fibers.

SUMMARY

Some aspects of the disclosure are directed to an optical module including a housing; optical adapters disposed at the housing; a cable inlet leading from an exterior of the housing to the interior of the housing; a splice location disposed within the interior of the housing; and a removable splice tray disposed within the interior of the housing at the splice location. The optical adapters have inner ports accessible from the interior of the housing and outer ports accessible from an exterior of the housing. Unterminated ends of optical pigtails are disposed at the splice location. Connectorized ends of the optical pigtails are plugged into the inner ports of the optical adapters. The splice tray defines a splice channel sized to receive an optical splice. The splice tray also defines a bend radius limiting arrangement surrounding the splice channel. The bend radius limiting arrangement provides storage for excess length of the optical pigtails and any optical fibers entering the housing from the optical cable.

In certain implementations, the splice channel is sized to receive a mass fusion splice.

In certain implementations, the splice channel is one of a plurality of splice channels of the removable splice tray.

In certain examples, the splice channels include a first splice channel that crosses with a second splice channel.

In certain implementations, the bend radius limiting arrangement of the removable splice tray does not include any outer support structure.

In certain implementations, the housing includes a base and a cover that cooperate to define the interior.

In certain examples, the cover is fully removable from the base.

In certain implementations, the cable inlet is disposed at an opposite end of the housing from the optical adapters.

In certain implementations, the housing includes a management spool around which excess length of the optical pigtails can be stored.

In certain implementations, the management spool is monolithically formed with part of the housing.

In certain implementations, a separator is disposed within the interior of the housing. The separator is disposed over a portion of the optical pigtails extending from the inner ports of the optical adapters. The removable splice tray is disposed over the separator.

In certain examples, the removable splice tray is mounted at the management spool. In an example, the management spool includes cable retention fingers. A portion of the removable splice tray seats on the cable retention fingers and another portion of the removable splice tray seats on the separator.

In certain implementations, guide fingers are disposed between the splice location and the optical adapters. The guide fingers are sufficiently spaced to enable the optical pigtails routed to the inner ports of the optical adapters to pass therebetween.

In certain examples, the guide fingers extend through holes of the separator to align the separator with the housing.

In certain implementations, a support ring is disposed in the housing. The support ring is not sufficiently high to provide bend radius protection for the optical pigtails. In an example, the separator rests on the support ring.

In certain implementations, the housing defines a routing channel at an opposite end of the housing from the optical adapters. The routing channel leads from the splice location to the cable inlet.

In certain implementations, the housing defines a first chamber and a second chamber. The optical adapters include a first group of optical adapters disposed at the first chamber and a second group of optical adapters disposed at the second chamber. The splice location and the removable splice tray are disposed at the first chamber. A second splice location and a second removable splice tray are disposed at the second chamber.

In certain examples, the cable inlet is a first cable inlet leading to the first chamber. A second cable inlet leads to the second chamber.

In certain examples, a wall divides the first chamber from the second chamber.

In certain examples, the wall defines a window or notch that enables optical fibers to extend from the first cable inlet to the second chamber and/or to extend from the second cable inlet to the first chamber.

In certain implementations, the first chamber has a base that is planar with a base of the second chamber.

In certain implementations, the first chamber is disposed side-by-side with the second chamber.

Other aspects of the disclosure are directed to an optical module including a housing defining an interior divided into a first chamber and a second chamber by a wall. The wall defines a pass-through aperture providing access between the first and second chambers. The wall inhibits any access between the first and second chambers except through the pass-through aperture. A first cable inlet leads from an exterior of the housing to the first chamber. A second cable inlet leads from the exterior of the housing to the second chamber. First optical adapters are disposed at the first chamber of the housing. Second optical adapters disposed at the second chamber of the housing. Each optical adapter arrangement has inner ports accessible from the respective chamber and outer ports accessible from the exterior of the housing. A first splice location is disposed within the first chamber and a second splice location is disposed within the second chamber. Unterminated ends of first optical pigtails are disposed at the first splice location. Connectorized ends of the first optical pigtails are plugged into the inner ports of the first adapter arrangement. Unterminated ends of second optical pigtails are disposed at the second splice location. Connectorized ends of the second optical pigtails are plugged into the inner ports of the second adapter arrangement.

In certain implementations, a first splice tray is disposed at the first splice location and a second splice tray disposed at the second splice location. Each splice tray defines a splice channel sized to receive an optical splice.

In certain implementations, each of the first and second splice trays defines a bend radius limiting arrangement that protects slack length of the respective optical pigtails.

In certain implementations, each chamber of the housing includes a respective first bend radius limiting arrangement and second bend radius limiting arrangement. The respective splice location is disposed between the respective first and second bend radius limiting arrangements.

In certain examples, the first bend radius limiting arrangement of each chamber is disposed between the respective splice location and the respective optical adapters. The first bend radius limiting arrangement of each chamber includes bend radius limiters sufficiently spaced apart to enable the respective optical pigtails to pass therebetween to reach the respective optical adapters.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to an optical module that receives an optical cable having multiple optical fibers. The optical module has a splice location and optical adapters. The optical fibers of the optical cable are directed from a cable inlet to the splice location. Optical pigtails lead from the splice location to inner ports of the optical adapters. The optical fibers are spliced to the optical pigtails at the splice location so that optical signals carried by the optical fibers are available at exterior ports of the optical adapters. Excess length of the optical fibers and/or excess length of the optical pigtails can be stored at bend radius limiting structures disposed within the module.

Figure 1:
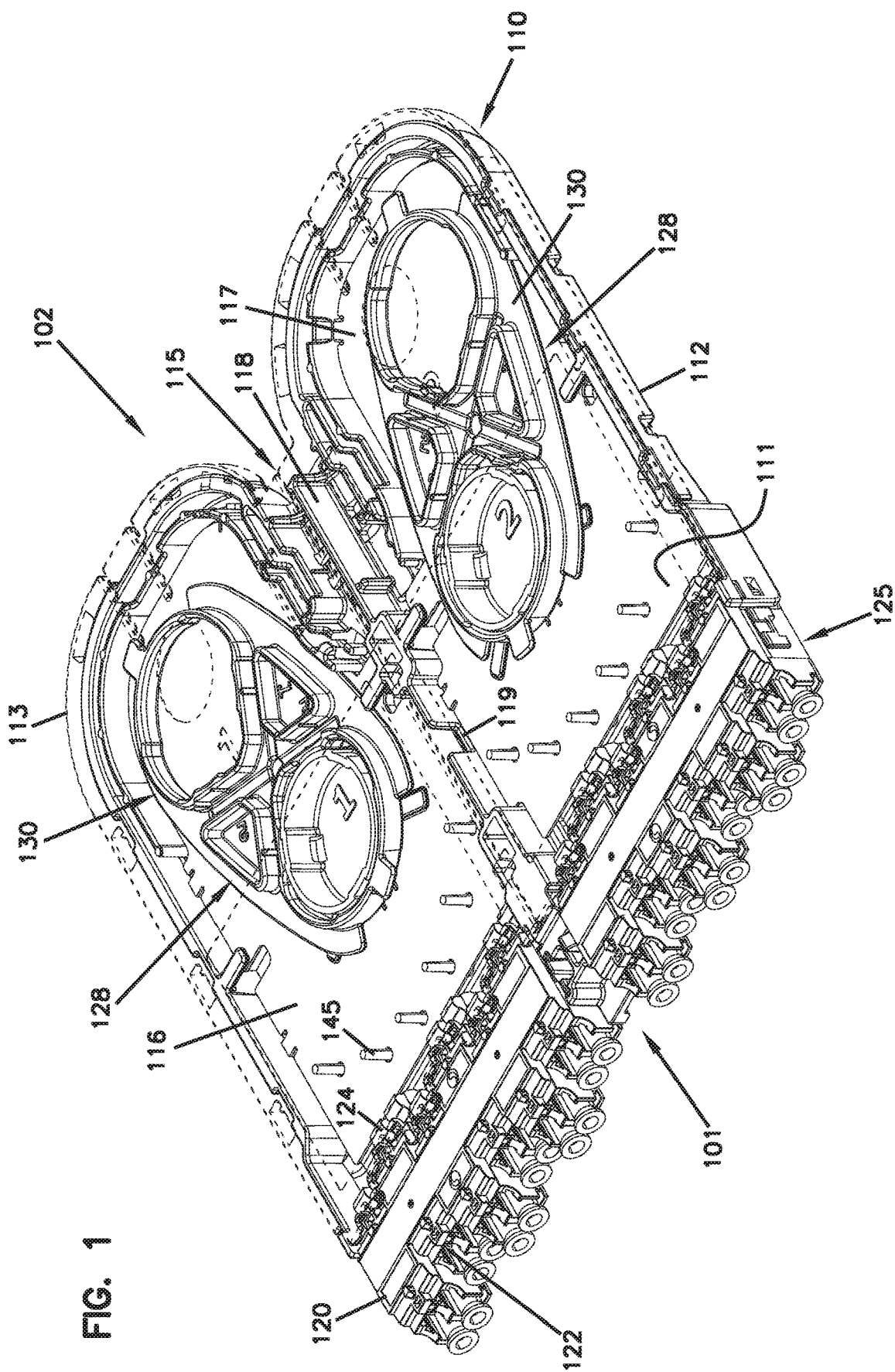
FIG. 1 is a top perspective view of an example optical module configured to hold a mass fusion splice in accordance with the principles of the present disclosure.
Figure 2:
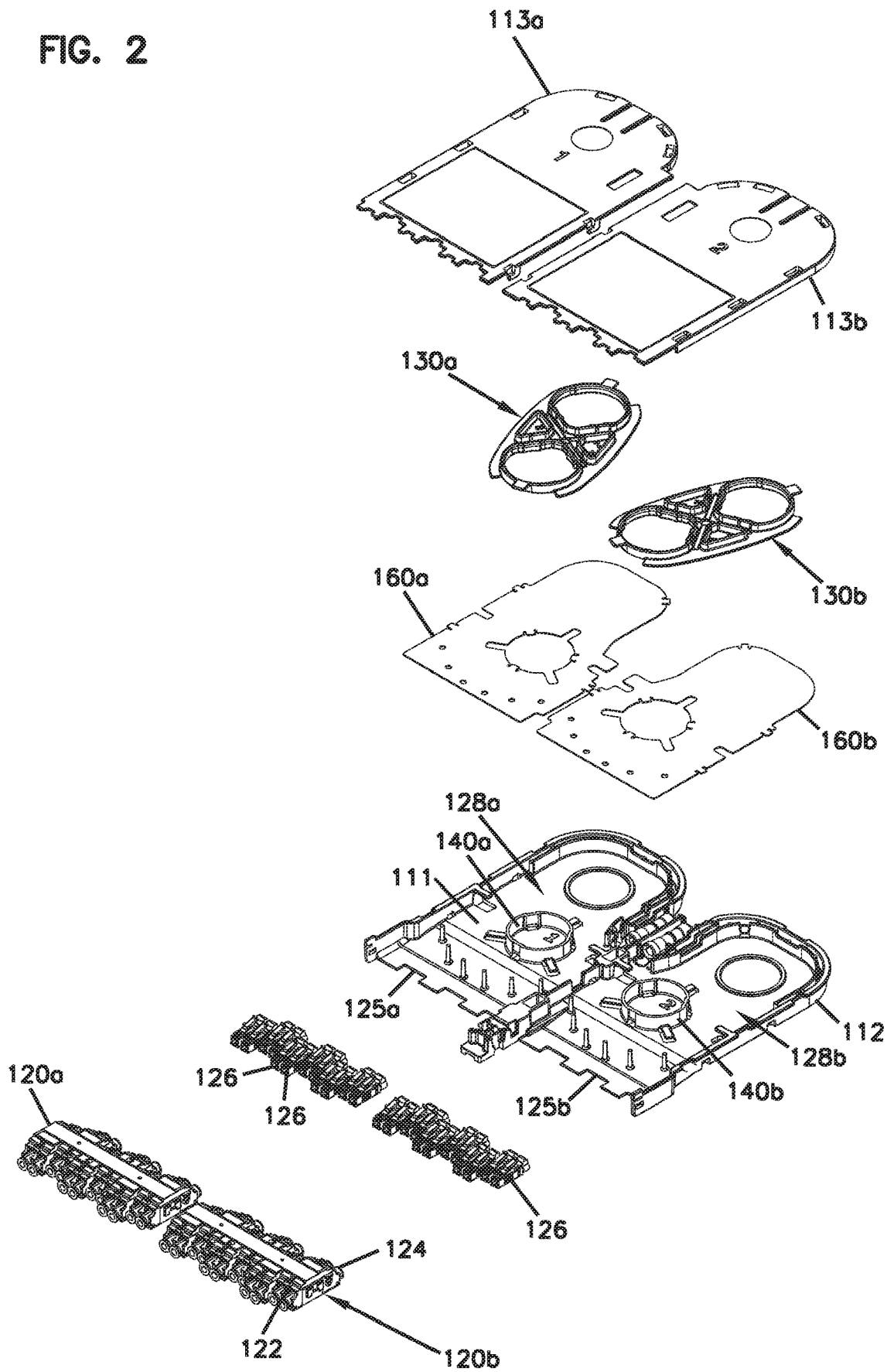
FIG. 2 is an exploded view of the optical modules of FIG. 1.
Figure 3:
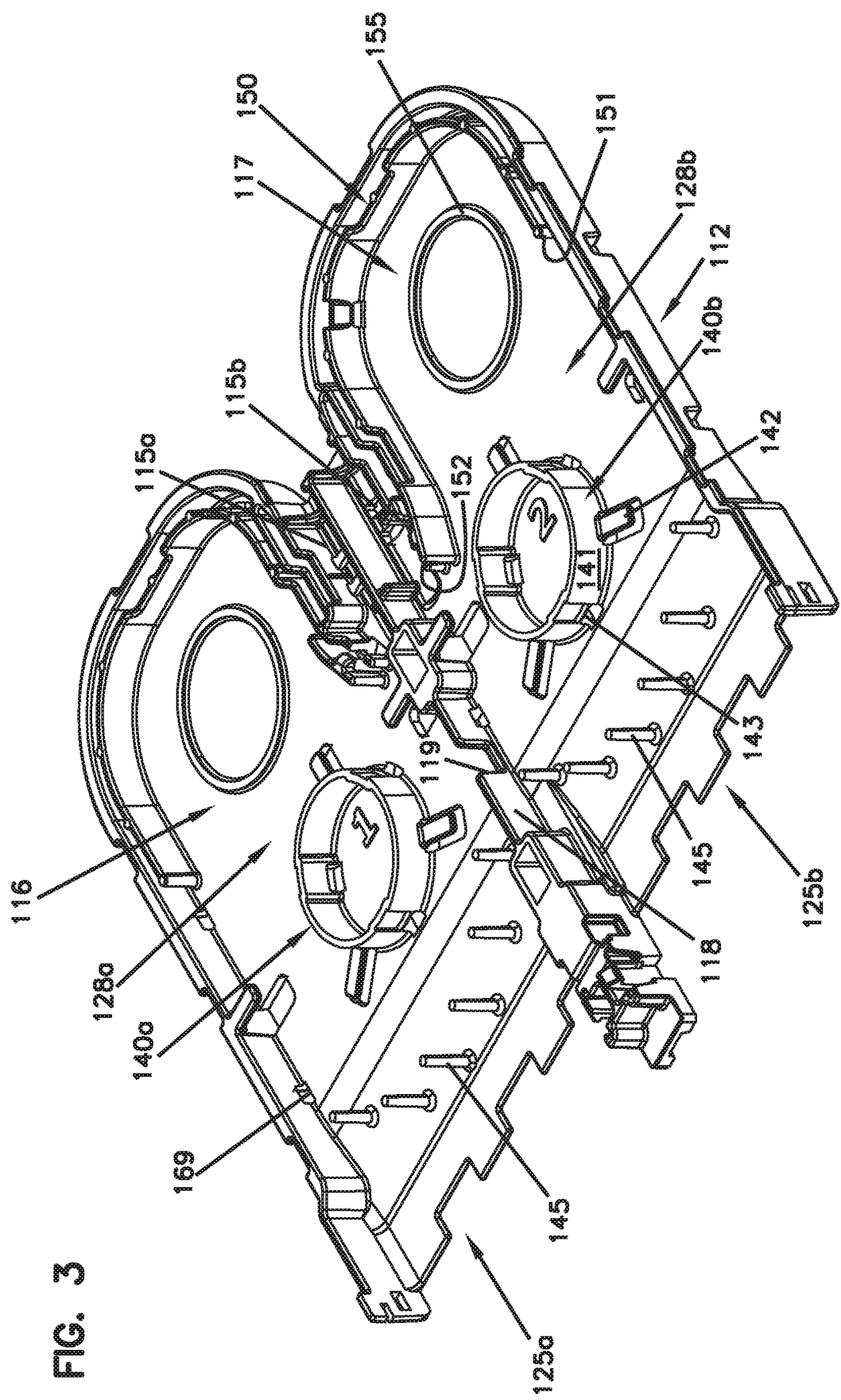
FIG. 3 is a top perspective view of a base of the optical module of FIG. 1.
Figure 4:
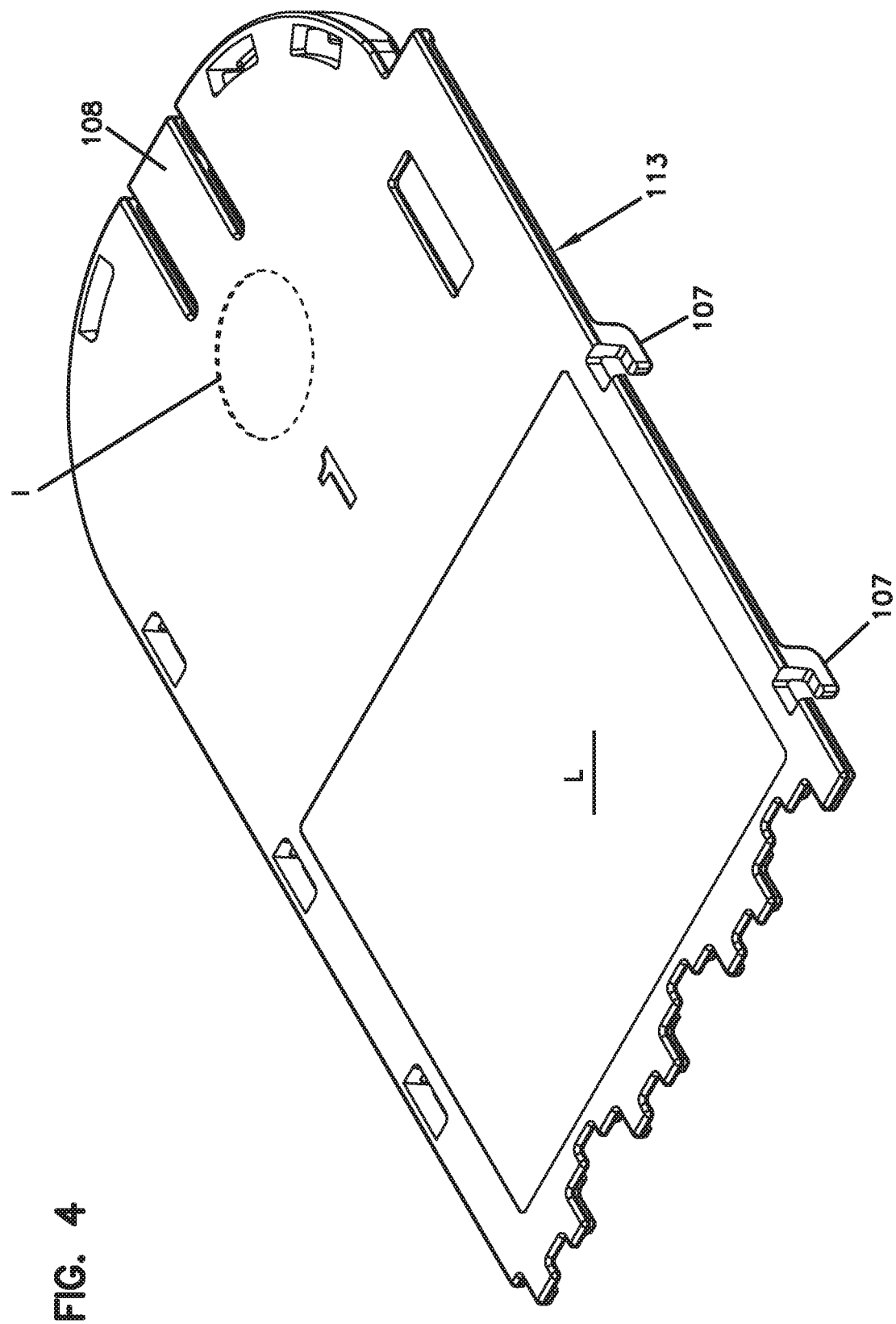
FIG. 4 is a top perspective view of an example cover of the optical module of FIG. 1.
Figure 5:
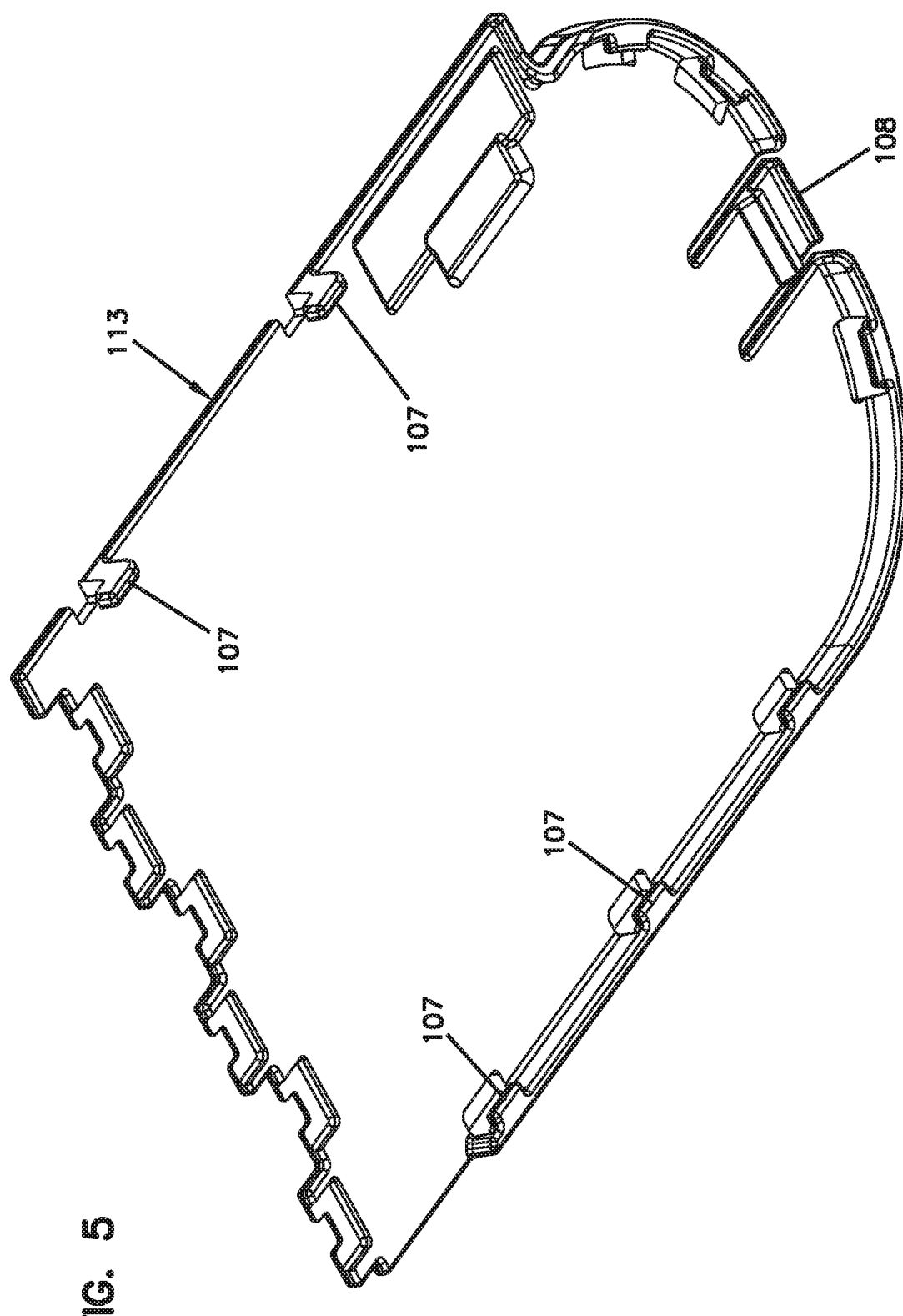
FIG. 5 is a bottom perspective view of the example cover of FIG. 4.
Figure 6:
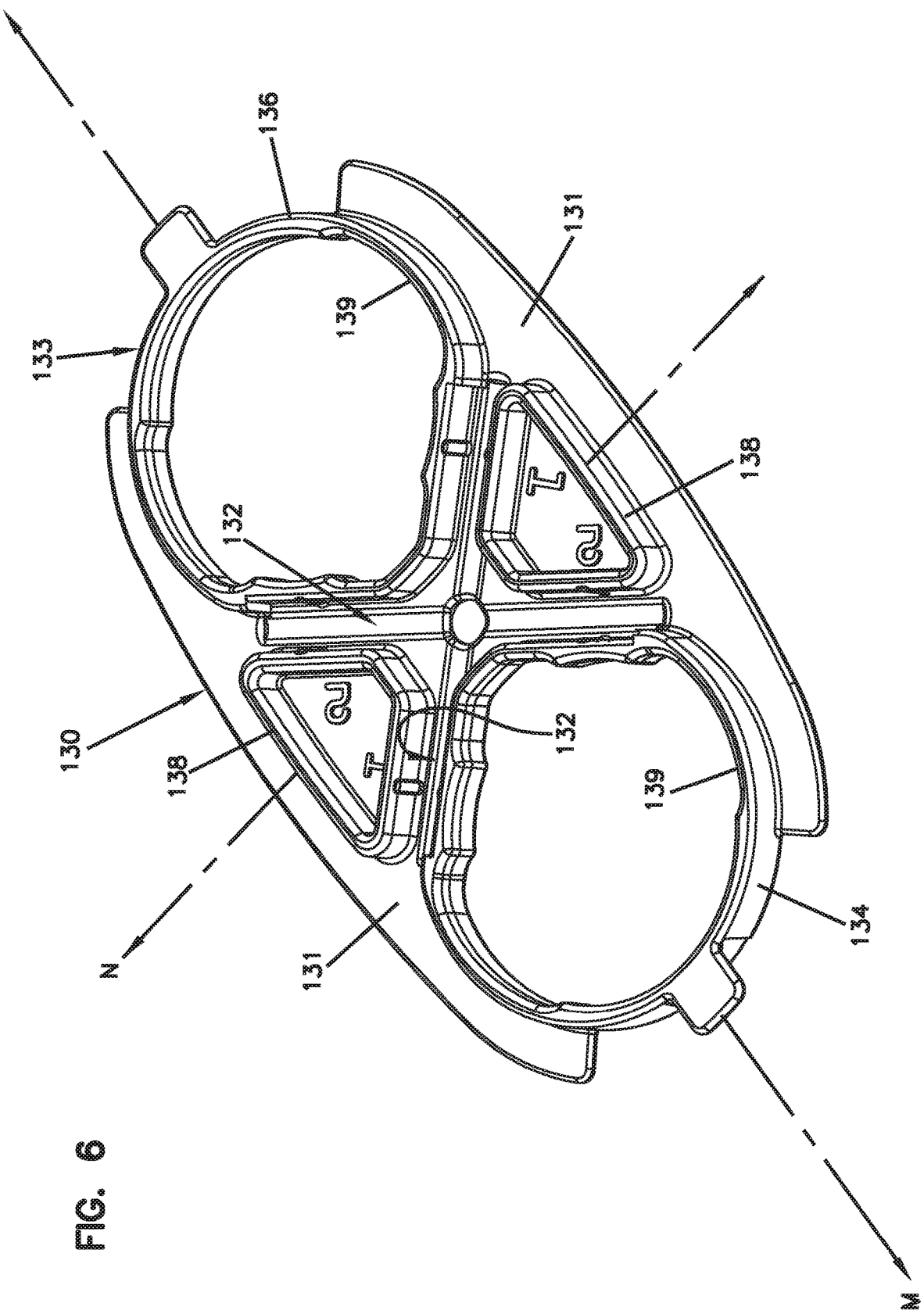
FIG. 6 is a top perspective view of an example splice tray suitable for use in the optical module of FIG. 1.
Figure 7:
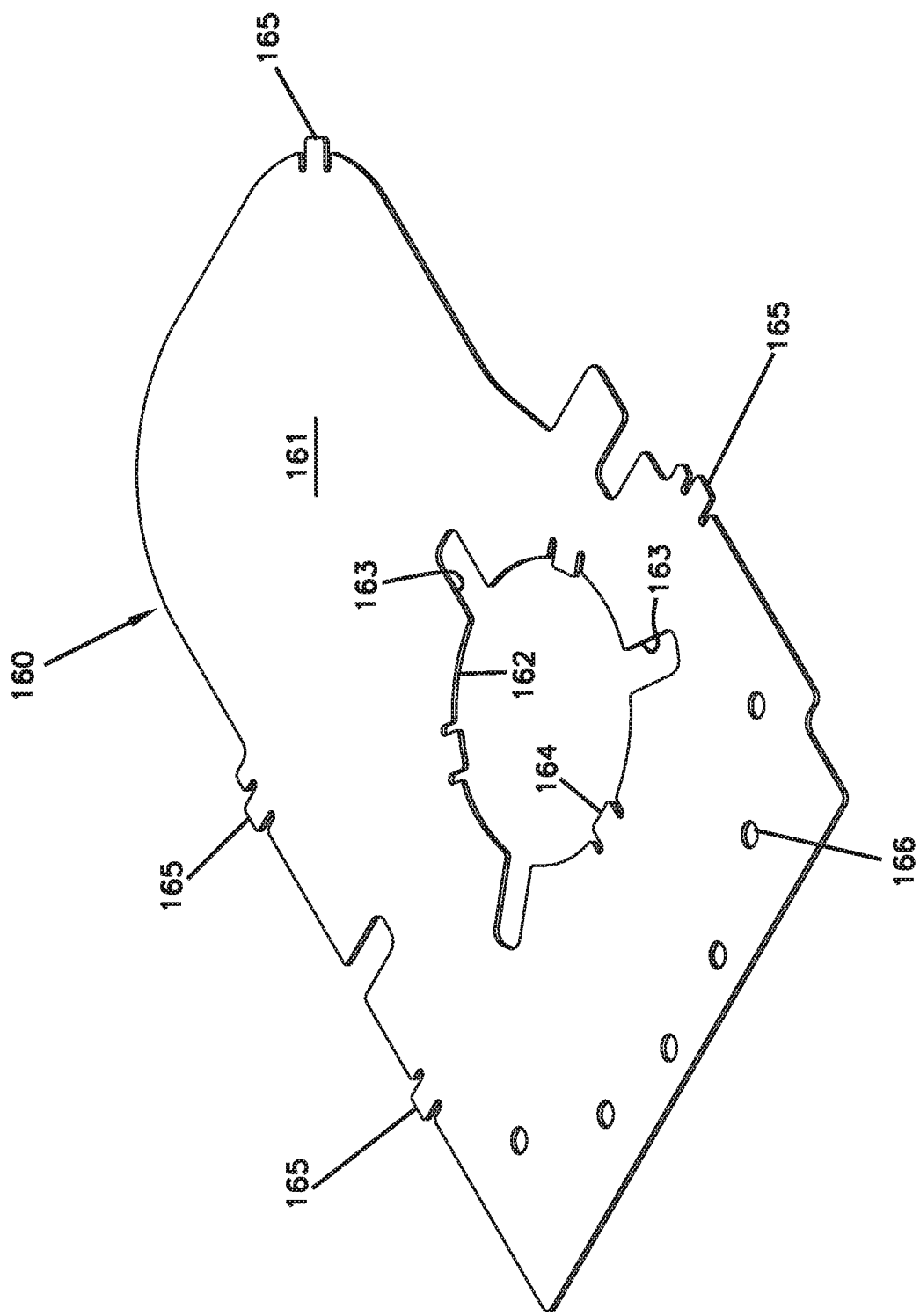
FIG. 7 is a perspective view of an example separator suitable for use in the optical module of FIG. 1.
Figure 8:
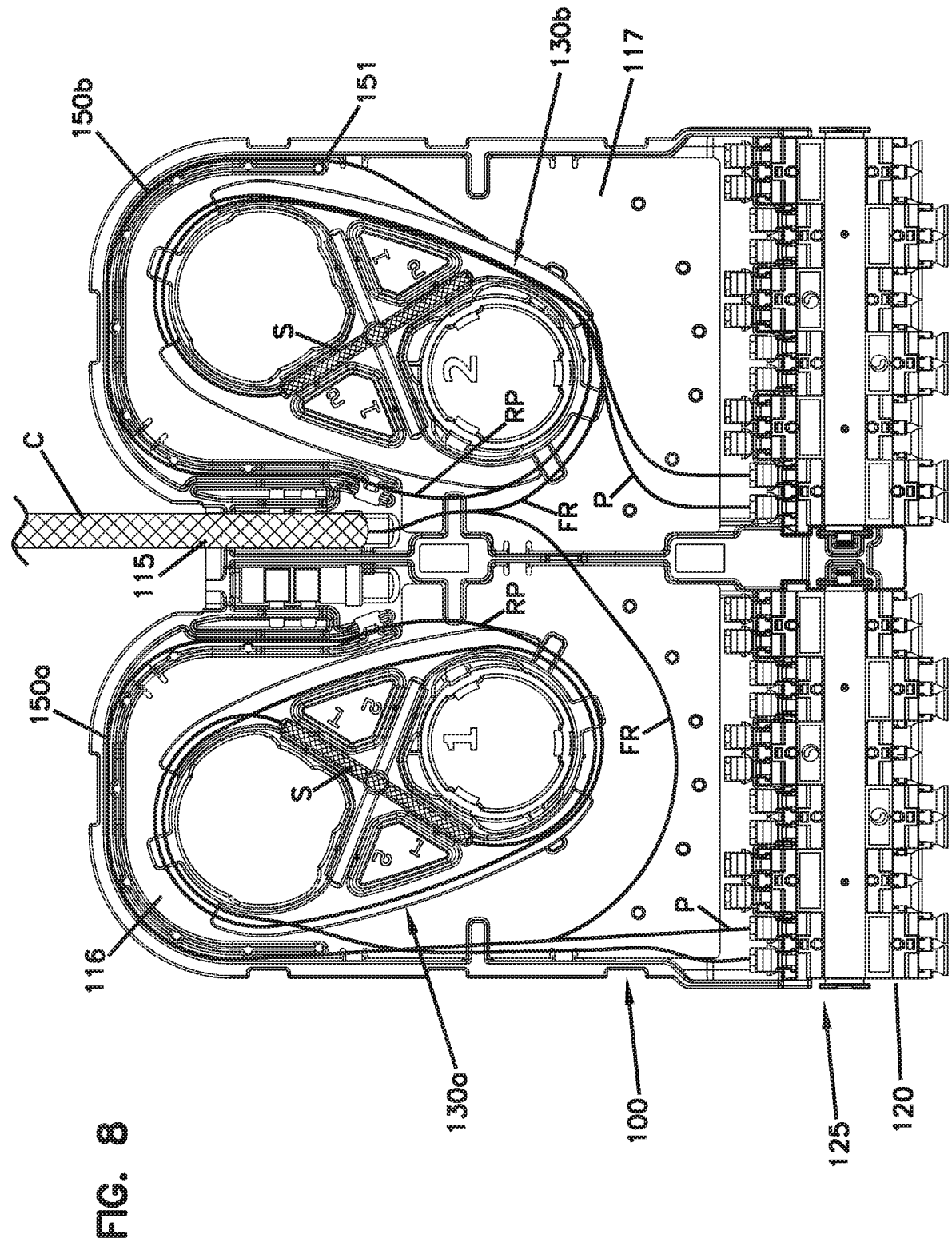
FIG. 8 is a top plan view of the optical module of FIG. 1 showing an example routing configuration.
Figure 9:
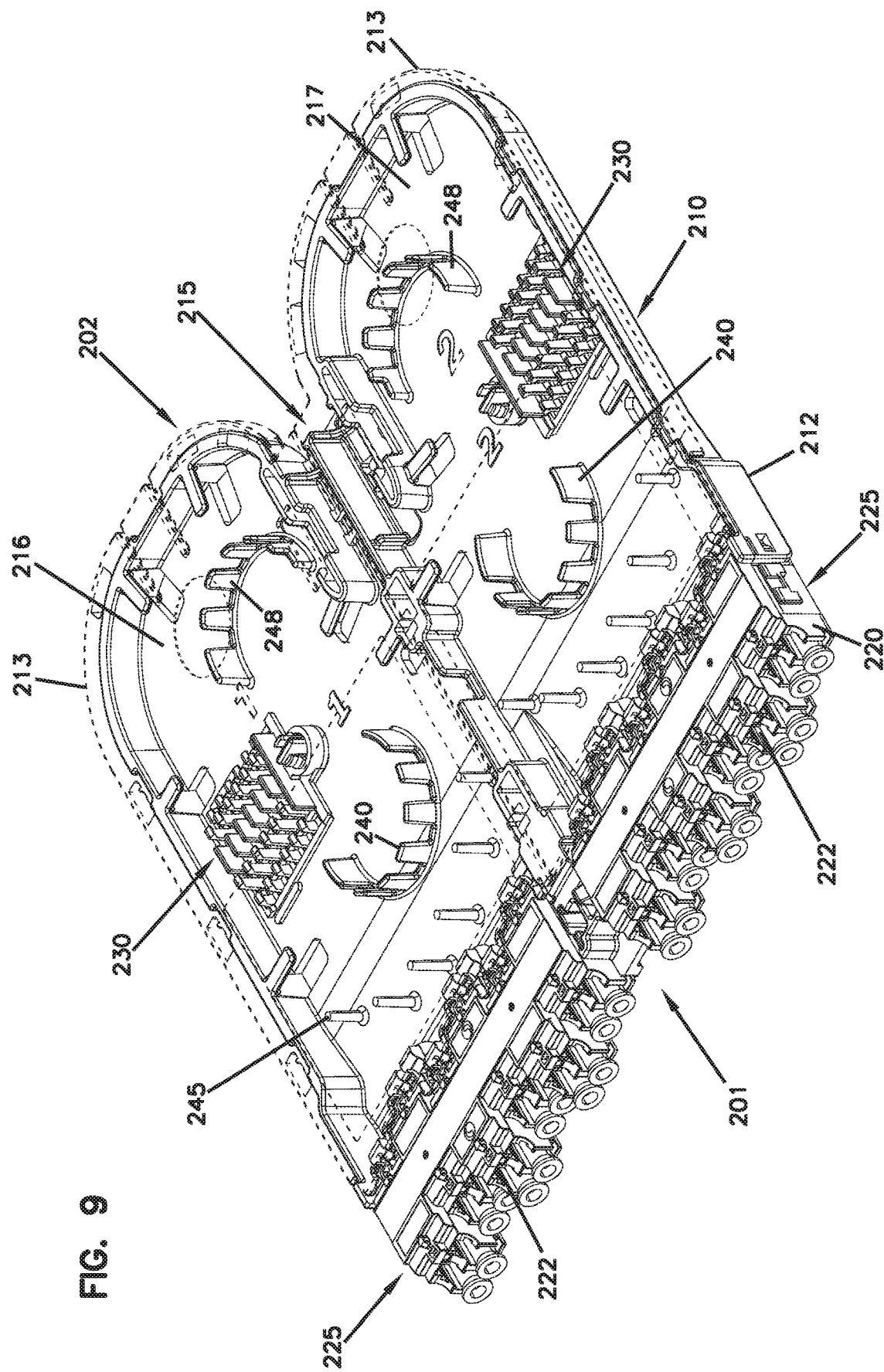
FIG. 9 is a top perspective view of another example optical module configured to hold individual splices in accordance with the principles of the present disclosure.
Figure 10:
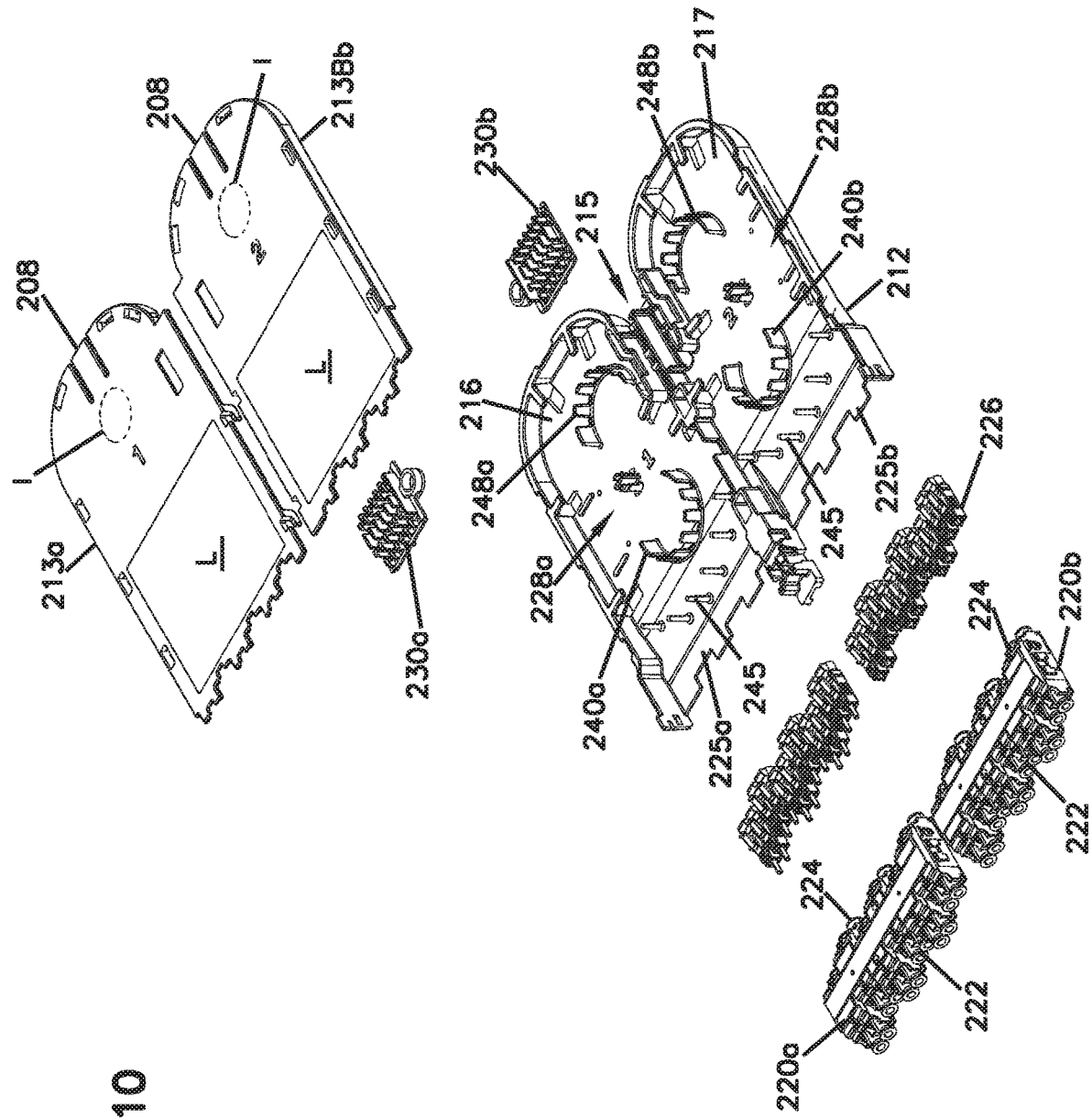
FIG. 10 is an exploded view of the optical module of FIG. 9.
Figure 11:
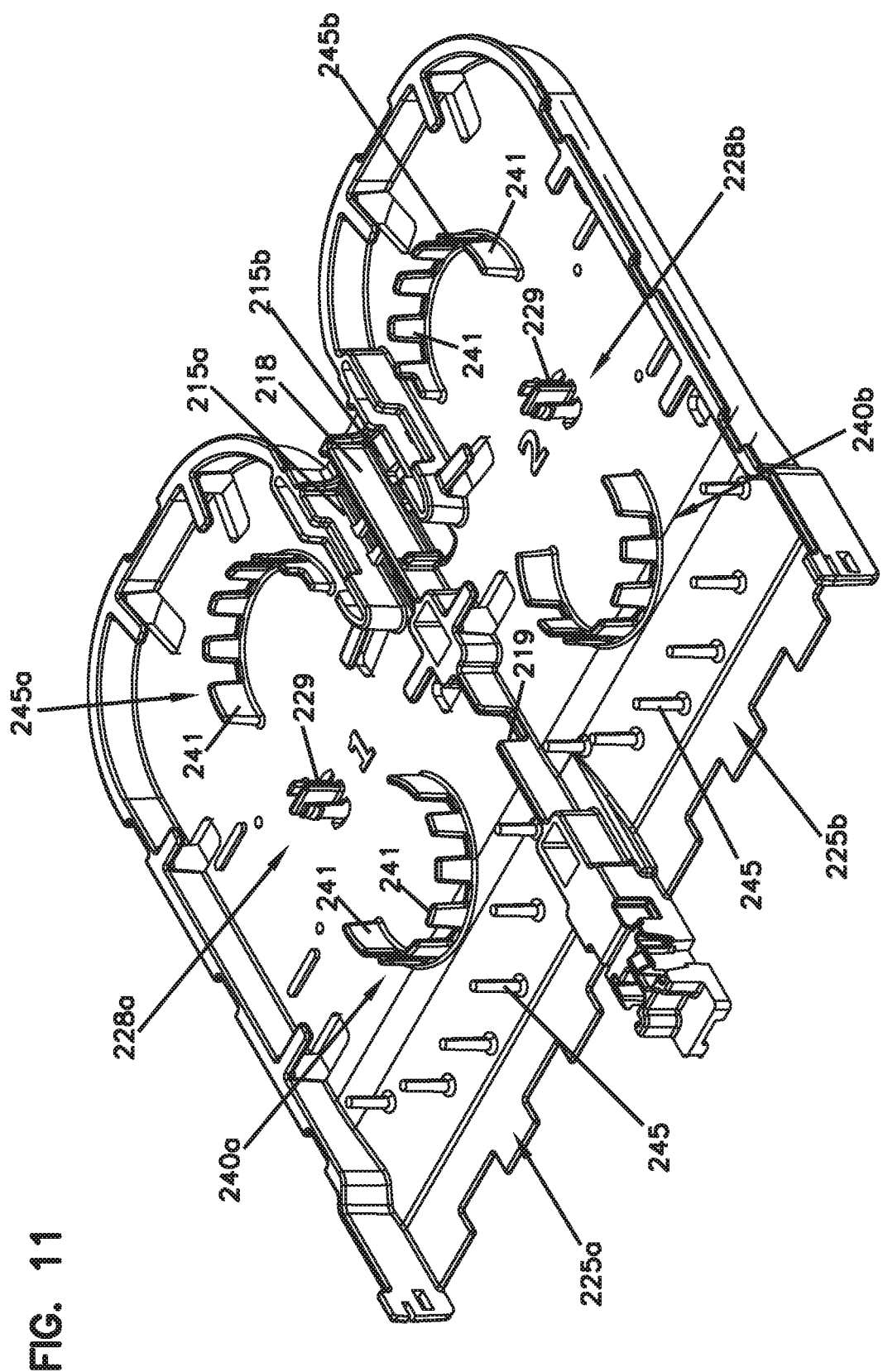
FIG. 11 is a top perspective view of a base of the optical module of FIG. 9.
Figure 12:
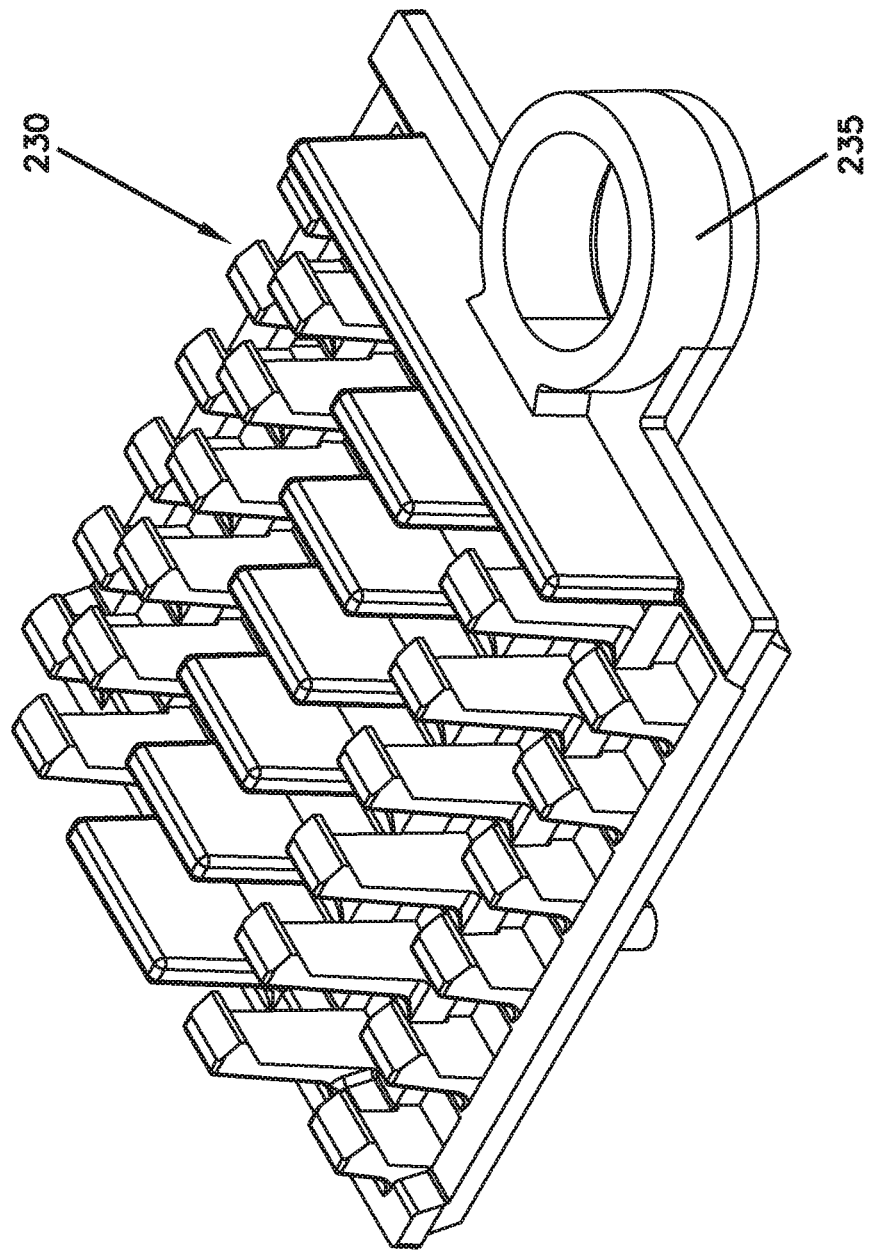
FIG. 12 is a top perspective view of an example splice chip suitable for use in the optical module of FIG. 9.
Figure 13:
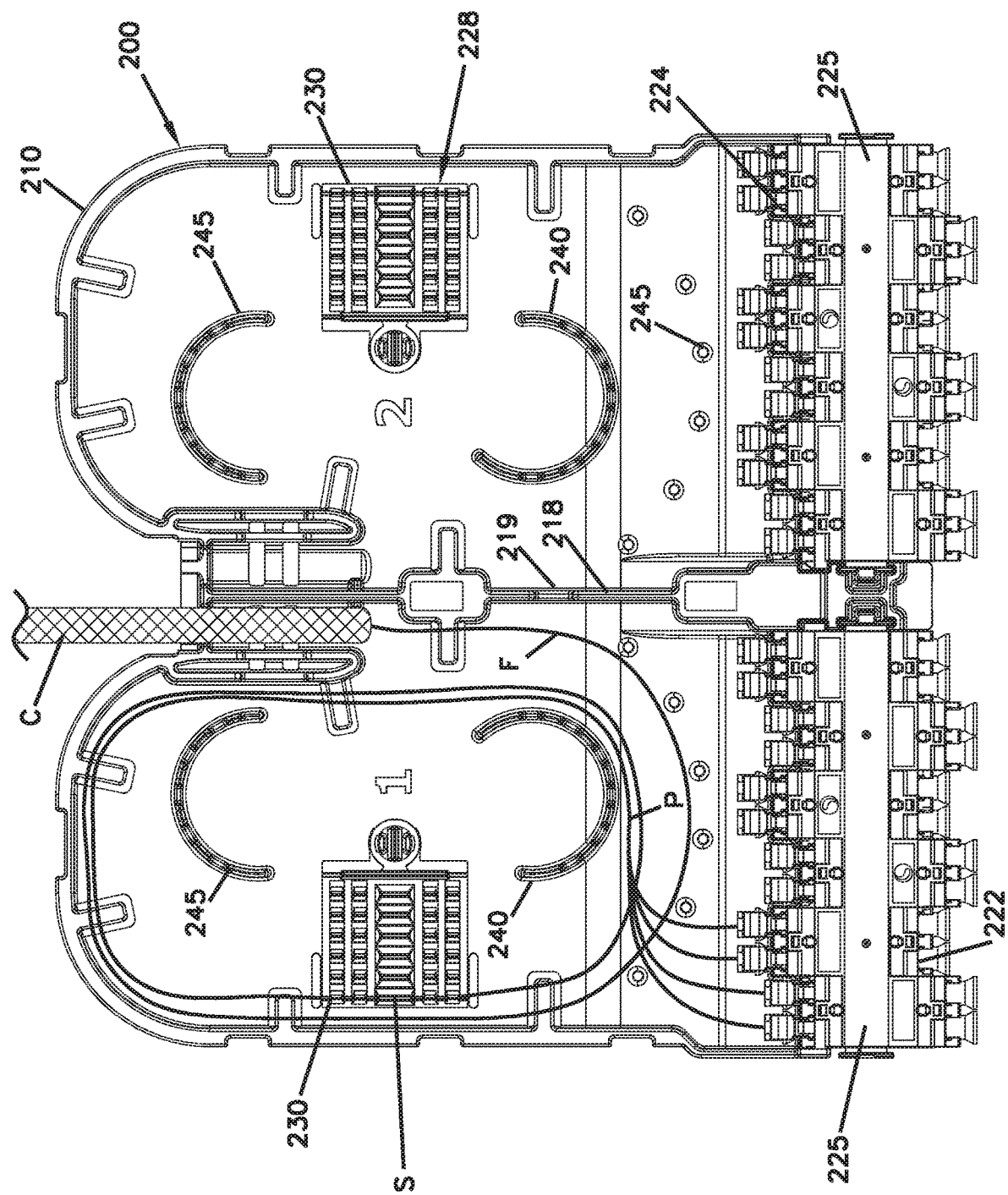
FIG. 13 is a top plan view of the optical module of FIG. 9 showing an example routing configuration.

FIGS. 1-13 illustrate example optical modules implementing features configured in accordance with the present disclosure. FIGS. 1-8 illustrate a first example optical module. FIGS. 9-13 illustrate a second example optical module implementing features configured in accordance with the present disclosure.

Referring first to the figures in general, an optical module 100, 200 includes a housing 110, 210 defining an interior 111, 211, respectively. The housing 110, 210 includes a cable inlet 115, 215 at which an optical cable C can be received at the module housing 110, 210, respectively. The housing 110, 210 also includes a termination location 125, 225 and a splice location 128, 228, respectively.

An optical adapter arrangement 120, 220 is disposed at the termination location 125, 225, respectively. Each optic adapter arrangement 120, 220 defines at least one outer port 122, 222 and at least one inner port 124, 224. The inner ports 124, 224 are accessible from within the interior 111, 211 of the housing 110, 210. The outer ports 122, 222 are accessible from an exterior of the housing 110, 210. In some examples, the optical adapter arrangement 120, 220 includes an adapter block defining a plurality of ports. In other examples, the optical adapter arrangement 120, 220 includes a plurality of separate optical adapters each defining at least one inner port and at least one outer port.

In certain implementations, the outer ports 122, 222 are arranged in a row. In some implementations, the outer ports 122, 222 are generally flush along the row. In other implementations, the outer ports 122, 222 are staggered forwardly and rearwardly along the row. In the example shown, pairs of outer ports 122, 222 are staggered along the row.

In some implementations, the module 100, 200 can be pre-cabled with optical pigtails P. The optical pigtails P extend from terminated ends to unterminated ends. The terminated ends of the optical pigtails P are plugged into the inner ports 124, 224 of the optical adapter arrangement 120, 220, respectively. The unterminated ends of the optical pigtails P are disposed at the splice location 128, 228, respectively.

In certain implementations, a bend radius limiting arrangement 140, 240 is disposed within the interior 111, 211 of the housing 110, 210 between the splice location 128, 228 and the termination arrangement 125, 225, respectively. The bend radius limiting arrangement 140, 240 is configured to store excess length of the optical pigtails P. For example, the bend radius limiting arrangement includes one or more bend radius limiters that form a spool or partial spool about which the optical pigtails P can be wrapped. In certain examples, the bend radius limiting arrangement 140, 240 may be monolithically formed with at least a portion (e.g., a base 112, 212) of the housing 110, 210.

In certain implementations, guide fingers 145, 245 are disposed within the housing interior 111, 211 adjacent the termination location 125, 225. For example, the guide fingers 145, 245 may be disposed between the bend radius limiting arrangement 140, 240 and the optical adapter arrangement 120, 220. The guide fingers 145, 245 are laterally spaced to enable the optical pigtails P to extend between the guide fingers 145, 245 when routed from the splice location 128, 228 and the termination location 125, 225.

In certain examples, the guide fingers 145, 245 may be monolithically formed with at least a portion (e.g., a base 112, 212) of the housing 110, 210. In the example shown, a guide finger 145, 245 is provided for each pair of inner ports 124, 224. In other examples, however, the module 100, 200 can have any number of guide fingers. In the example shown, the guide fingers 145, 245 are arranged along a curved path. In other examples, the guide fingers 145, 245 can be arranged along a straight line, a staggered line, or any other desired configuration.

An optical cable C can be routed to the cable inlet 115, 215 of the module 100, 200, respectively. In certain implementations, the optical cable C can be secured to the housing 110, 210 at the cable inlet 115, 215. In some examples, the optical cable C can be tied (e.g., using a cord or zip-tie) to the housing 110, 210. In other examples, the optical cable C or portions thereof (e.g., strength members or outer jacket) can be glued, crimped, or otherwise anchored to the housing 110, 210.

Fibers of the optical cable C are routed from the cable inlet 115, 215 to the splice location 128, 228, respectively. Ends of the optical fibers are spliced to the unterminated ends of the optical pigtails P at the splice location 128, 228, respectively. Accordingly, any optical signals carried by the fibers of the optical cable C are made available at the outer ports 122, 222 of the optical adapter arrangement 120, 220, respectively.

In some implementations, the termination location 125, 225 is disposed at an opposite ends of the module housing 110, 210 from the cable inlet 115, 215, respectively. For example, the termination location 125, 225 can be located at a front 101, 201 of the module housing 110, 210 and the cable inlet 115, 215 can be located at a rear 102, 202 of the module housing 110, 210. In certain examples, the cable inlet 115, 215 is recessed forwardly relative to a remainder of the rear end 102, 202. In certain examples, the cable inlet 115, 215 is located at a central portion of the rear end 102, 202 of the housing 110, 210, respectively.

In some implementations, the housing 110, 210 includes a base 112, 212 and a cover 113, 213 that cooperate to define the interior 111, 211, respectively. In certain implementations, the cover 113, 213 is fully removable from the base 112, 212. For example, the cover 113, 213 may be latched to the base 112, 212. In certain examples, the cover 113, 213 includes an indicator In the example shown, the cover 113, 213 includes a rear latch 108, 208. In certain examples, the cover 113, 213 includes retention members (e.g., tabs, slots, etc.) 107, 207 that cooperate with retention members (e.g., slots, tabs, etc.) of the base 112, 212 to aid in holding the cover 113, 213 to the base 112, 212.

In certain examples, the cover 113, 213 is configured to carry a label L for the module 100, 200, respectively. In certain examples, the label L is configured to identify the outer ports 122, 222. For example, port indicia can be printed on the label L. In other examples, separate labels can be provided for each port or group of two or more ports.

In certain examples, the cover 113, 213 inhibits removal of the optical adapter arrangement 120, 220 from the termination location 125, 225 when the cover 113, 213 is mounted on the base 112, 212, respectively. In other examples, the optical adapter arrangement 120, 220 is fixedly held at the termination arrangement 125, 225 regardless of the position of the cover 113, 213. In still other examples, the optical adapter arrangement 120, 220 is removable from the housing 110, 210 regardless of the position of the cover 113, 213.

Still referring to the figures in general, certain types of optical modules 100, 200 are divided into a first chamber 116, 216 and a second chamber 117, 217, respectively. A wall 118, 218 extends between the first chamber 116, 216 and the second chamber 117, 217 to inhibit access between the chambers. In certain examples, the wall 118, 218 extends between a front 101, 201 of the housing 110, 210 and a rear 102, 202 of the housing 110, 210. In some implementations, the optical adapter arrangement 120, 220 is a first optical adapter arrangement 120a, 220a associated with the first chamber 116, 216 and a second optical adapter arrangement 120b, 220b is associated with the second chamber 117, 217.

In some implementations, each chamber 116, 216, 117, 217 has a corresponding cover 113a, 113b, 213a, 213b, respectively, that is independently mountable to and removable from the base 112. In other implementations, a single cover 113, 213 extends across both chambers 116, 117, 216, 217 the base 112, 212.

In certain implementations, the cable inlet 115, 215 is a first cable inlet 115a, 215a that is associated with the first chamber 116, 216, respectively. A second cable inlet 115b, 215b is associated with the second chamber 117, 217. The first cable inlet 115a, 215a is located adjacent the second cable inlet 115b, 215b and separated from each other by the wall 118, 218.

In certain implementations, the termination location 125, 225 is a first termination location 125a, 225a that is associated with the first chamber 116, 216, respectively. A second termination location 125b, 225b is associated with the second chamber 117, 217. In certain examples, the first termination location 125a, 225a aligns with the first cable inlet 115a, 215a along an axis that is parallel to the insertion axes of the connectorized ends 126, 226 of the optical pigtails P. In such examples, the second termination location 125b, 225b aligns with the second cable inlet 115b, 215b along an axis that is parallel to the insertion axes of the connectorized ends 126, 226 of the optical pigtails P.

In some implementations, the optical adapter arrangement 120, 220 is a first adapter arrangement 120a, 220a that is disposed at the first termination location 125a, 225a, respectively. A second adapter arrangement 120b, 220b is disposed at the second termination location 125b, 225b. In certain examples, the first adapter arrangement 120a, 220a is laterally aligned with the second adapter arrangement 120b, 220b. In other implementations, a single optical adapter arrangement 120, 220 extends across both termination locations 125a, 125b, 225a, 225b, respectively.

In certain implementations, the splice location 128, 228 is a first splice location 128a, 228a that is associated with the first chamber 116, 216, respectively. A second splice location 128b, 228b is associated with the second chamber 117, 217.

In such implementations, the bend radius limiting arrangement 140, 240 is a first bend radius limiting arrangement 140a, 240a that is associated with the first chamber 116, 216, respectively. A second bend radius limiting arrangement 140b, 240b is associated with the second chamber 117, 217.

In some implementations, a first optical cable C can be routed to the first cable inlet 115a, 215a and a second optical cable C can be routed to the second cable inlet 115b, 215b, respectively. Optical fibers of the first optical cable C can be routed to the first splice location 128a, 228a and optical fibers of the second optical cable C can be routed to the second splice location 128b, 228b. In certain examples, some of the optical fibers can be routed through the aperture 119, 219 defined in the wall 118, 218 to the splice location of the other chamber 117, 217, 116, 216.

In other implementations, only a single optical cable C is routed to the module 100, 200. The single optical cable C can be routed to either the first cable inlet 115a, 215a or to the second cable inlet 115b, 215b. The optical fibers are routed from the cable inlet to the chamber 116, 216, 117, 217 associated with the cable inlet. Some of the optical fibers remain in the chamber 116, 216, 117, 217 associated with the cable inlet for splicing. Others of the optical fibers are routed through the aperture 119, 219 in the wall 118, 218 to the other chamber 117, 217, 116, 216 for splicing.

In some implementations, the optical fibers of the optical cable(s) C are ribbonized. In such implementations, the unterminated ends of the optical pigtails P also are ribbonized (e.g., at the manufacturing facility, in the field, etc.). In certain examples, the ribbonized ends of the optical pigtails P are spliced to the ribbonized ends of the optical fibers using a mass fusion splice S. In other implementations, the optical fibers of the optical cable(s) C extend from the cable jacket as separate strands. In such implementations, the unterminated ends of the optical pigtails P are spliced (e.g., fusion spliced, mechanically spliced, etc.) to the unterminated ends of the separate optical fibers using individual splices.

FIGS. 1-8 illustrate an example module 100 configured to support a mass fusion splice S of ribbonized cables. FIGS. 9-13 illustrate an example module 200 configured to support individual splices of stranded cables.

Referring now to FIGS. 1-8, the optical module 100 includes a removable splice tray 130. The optical pigtails P extending from the inner ports 124 at the termination location 120 are separate strands. Excess fiber length of the separate strands is stored at the bend radius limiting arrangement 140. The separate optical pigtails P are transitioned to a ribbon that is routed to the splice tray 130 at the splice location 128.

The splice tray 130 is removably disposed within the housing 110 at the splice location 128. The splice tray 130 includes a base 131 defining at least one splice channel 132 sized to receive a mass fusion splice S. In certain examples, the base 131 defines a first splice channel 132 and a second splice channel 132. In the example shown, the first and second splice channels 132 cross each other. Accordingly, in certain examples, a mass fusion splice S can be positioned in only one of the channels 132 at any one time.

The splice tray 130 also defines a bend radius limiting arrangement 133 surrounding the splice channel(s) 132. In some implementations, the bend radius limiting arrangement 133 provides storage for excess length of the ribbonized portion RP of the optical pigtails P. In other implementations, the bend radius limiting arrangement 133 provides storage for excess length of a fiber ribbon FR of the optical cable C received at the cable inlet 115. In still other implementations, the bend radius limiting arrangement 133 provides storage for excess length of both the ribbonized portion RP of the optical pigtails P and the fiber ribbon FR of the optical cable C.

In certain implementations, the bend radius limiting arrangement 133 includes a first bend radius limiter 134 disposed at a first side of the splice channels 132 and a second bend radius limiter 136 disposed at an opposite second side of the splice channels 132. The second bend radius limiter 136 facing in an opposite direction than the first bend radius limiter 134. Each of the bend radius limiters 134, 136 includes a retention tab 136, 137. In certain examples, walls 138 extend between the first and second bend radius limiters 134, 136 at opposite ends of the splice channels 132. The bend radius limiters 134, 136 and walls 138 cooperate to define a storage spool about which the ribbon(s) can be wrapped.

In certain implementations, the base 131 extends outwardly from the bend radius limiting arrangement 133. For example, in some examples, a first portion of the base 131 may extend radially outwardly from first ends of the splice channels 132 and wrap partially around the first and second bend radius limiters 134, 136 and a second portion of the base 131 may extend radially outwardly from second ends of the splice channels 132 and wrap partially around the first and second bend radius limiters 134, 136. In an example, the retention tabs 136, 137 do not align with the base 131. In other examples, the base 131 may extend radially outwardly from a full periphery of the bend radius limiting arrangement 133.

In certain examples, the splice tray 130 does not include outer walls or structure to retain the ribbon(s) on the splice tray 130. Rather, the ribbon(s) are allowed to flex radially away from the bend radius limiting arrangement 133 and off the base 131.

In some implementations, the base 131 defines an aperture 139 sized to enable the cable spool 141 to extend therethrough. The bend radius limiter 134 partially bounds the aperture 139. Another portion of the aperture 139 is bounded by walls of the splice channels 132. In certain examples, the base 131 defines a second aperture 139 partially bounded by the bend radius limiter 136. In an example, the second aperture 139 is the same size as the first aperture 139.

In an example, the splice tray 130 is symmetrical about a major dimension M of the splice tray 130. In an example, the splice tray 130 is symmetrical about a minor dimension N of the splice tray 130.

In some implementations, a separator 160 is disposed within the housing 110 to assist in cable management. For example, the separator 160 is disposed over the stranded optical pigtails P to protect the individual optical pigtails P from the heavier fiber ribbons FR.

In some implementations, the base 112 of the housing 110 defines a routing channel 150 extending from an entrance end 151 to an exit end 152. The routing channel 150 is disposed at the rear 102 of the housing 110. In certain examples, the exit end 152 of the routing channel 150 is disposed adjacent the cable inlet 115. The ribbonized end of the optical pigtails P extends from the routing channel exit 152 above the separator 160.

In certain examples, the routing channel 150 is contoured to route about a support ring 155 extending upwardly from the base 112. The support ring 155 does not extend sufficiently upwardly to enable optical fibers to be wrapped therearound. In certain examples, a height of the support ring 155 is no more than the diameter of three optical pigtails P. In examples, the height of the support ring 155 is no more than the diameter of two optical pigtails P. In an example, the height of the support ring 155 is no more than the diameter of one of the optical pigtails P.

In certain implementations, the bend radius limiting arrangement 140 includes a cable spool 141 including retention fingers 142 extending radially outwardly from the cable spool 141. In certain examples, the cable spool 141 defines notches or apertures 143 facing radially outwardly from the cable spool 141. In an example, the notches 143 are disposed at a common height with or above the retention fingers 142.

The pigtail fibers extend from the termination location 125 and wrap around the spool 141 beneath the retention fingers 142. The optical fibers extend from the spool 141 to the entrance end 151 of the routing channel 150. The pigtail fibers transition to a fiber ribbon FR so that the fiber ribbon FR extends along at least a portion of the routing channel 150. The fiber ribbon FR extends through the exit end 152 of the routing channel 150 and towards the splice location 128.

The separator 160 is disposed within the housing 110 to seat on the optical pigtails P and on the support ring 155. For example, a forward portion of the separator 160 seats on the optical pigtails P and a rearward portion of the separator 160 seats on the support ring 155. In certain examples, the separator 160 is generally parallel with a bottom of the base 110 when the separator 160 is mounted on the optical pigtails P and the support ring 155.

The separator 160 includes a body 161 and retention tabs 165 extending outwardly from a peripheral edge of the planar body 161. The retention tabs 165 fit into apertures 169 defined by the housing 110. For example, the retention tabs 165 may fit into notches 169 defined in the base 112 of the housing 110. The body 161 of the separator 160 defines an aperture 162 sized to receive the cable spool 141. The body 161 also defines notches 162 extending outwardly from the aperture 162. The notches 162 align with and receive the retention fingers 142 of the spool 141 when the separator 160 is disposed within the housing 110. Accordingly, the separator body 161 is generally flush with the retention fingers 142. The separate optical pigtails P pass beneath the retention fingers 142 and the separator body 161. The body 161 also defines tabs 164 that extend radially into the aperture 162. The tabs 164 fit into the apertures 143 defined in the cable spool 141 to aid in holding the separator 160 in position.

When the optical cable C is received at the cable inlet 115, the splice tray 130 is removed from the housing 110 and placed at a maintenance location remove from the module 100. The fiber ribbon FR of the optical cable C and the ribbonized portion RP of the optical pigtails P are routed to the splice tray 130 at the maintenance location. The fiber ribbon FR and the ribbonized portion RP are spliced together using a mass fusion splice S at the maintenance location. The mass fusion splice S is deposited into one of the splice channels 132 in the splice tray 130. Excess length of the fiber ribbon FR and the ribbonized portion RP are then wrapped around the bend radius limiting arrangement 133 as the splice tray 130 is moved back to the module 100.

The splice tray 130 is positioned within the housing interior 111 by aligning one of the apertures 139 over the cable spool 140. The splice tray 130 is placed downwardly until the splice tray 130 seats on the retention fingers 142 of the cable spool 140 and/or on the separator 160. For example, the base 131 may seat on the retention fingers 142 and/or on the separator 160.

When the loaded splice tray 130 has been positioned in the housing 110, outer windings of the fiber ribbon FR and ribbonized portion RP may flex off the base 131 of the splice tray 130 and onto the separator 160. In certain examples, the guide fingers 145 inhibit the fiber ribbon FR and/or ribbonized portion RP from reaching the inner ports of the optical adapter arrangement 120.

In certain implementations, each chamber 116, 117 of the housing 110 has a removable splice tray 130, a separate routing channel 150, and a separate separator 160. In some implementations, the splice tray 130 of the first chamber 116 may be identical to the splice tray 130 of the second chamber 117, but oriented in a different rotational position. The crossing splice channels 132 allows the user to accommodate the rotational position of the splice in each chamber 116, 117 using the same splice tray 130.

In certain examples, the separator 160 of the first chamber 116 is identical to the separator of the second chamber 117, except that the separator 160 has been flipped upside down compared to the separator 160 of the first chamber 116.

The exit ends 152 of the routing channels 150 are disposed adjacent the cable inlets 115a, 115b. The entrance ends 151 of the routing channels 150 are disposed at opposite sides of the housing 110. In certain examples, each chamber 116, 117 has a respective support ring 155 disposed between the splice location 128a, 128b and the respective routing channel 150.

Referring now to FIGS. 9-13, the optical module 200 includes a splice chip 230 that mounts within the housing 210. For example, a mounting structure 229 may be disposed at the splice location 228 and a corresponding mounting structure 235 may be disposed on the splice chip 230. The mounting structures 235, 229 engage each other to secure the splice chip 230 to the housing 210. The splice chip 230 is configured to hold one or more individual fiber splices S. For example, the splice chip 230 may hold the individual fiber splices in rows and/or stacks. In certain examples, the splice chip 230 is removable from the housing 210.

The bend radius limiting arrangement 240 defines a convexly contoured surface facing the inner ports 224 of the optical adapter arrangement 220. In certain implementations, the bend radius limiting arrangement 240 includes a set of bend radius limiters 241 that cooperate to form the convexly contoured surface. In certain examples, the bend radius limiters are spaced from each other sufficient to enable the optical pigtails to extend therebetween.

A second bend radius limiting arrangement 245 is disposed at an opposite side of the splice location 228 from the first bend radius limiting arrangement 240. For example, the first bend radius limiting arrangement 240 may be disposed forward of the splice location 228 and the second bend radius limiting arrangement 245 may be disposed rearward of the splice location 228.

When the optical cable C is received at the cable inlet 215, optical fibers F of the optical cable C and unterminated ends of the optical pigtails P are routed to the splice chip 230. The optical fibers F and the pigtails P are spliced together using individual splices S. In some examples, the splice chip 230 is removed from the housing during the splicing process and mounted within the housing 210 after the splices S are stored at the splice chip 230. In other examples, the splice chip 230 can remain in the housing 210 during the splicing process. Excess length of the fibers F and/or the pigtails P are then wrapped around the bend radius limiting arrangements 140, 145.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An optical module comprising:
a housing defining an interior, the housing including a management spool having at least one alignment aperture;
an optical adapter arrangement disposed at the housing, the optical adapter arrangement having inner ports accessible from the interior of the housing and outer ports accessible from an exterior of the housing;
a cable inlet leading from the exterior of the housing to the interior of the housing, the cable inlet being configured to receive an optical cable including a plurality of optical fibers;
a splice location disposed within the interior of the housing;
a plurality of optical pigtails extending from unterminated ends to connectorized ends, the unterminated ends being disposed at the splice location, the connectorized ends being plugged into the inner ports of the optical adapter arrangement; and
a separator disposed within the interior of the housing, the separator disposed over a portion of the optical pigtails extending from the inner ports of the optical adapter arrangement, the separator having at least one alignment tab configured to partially engage the at least one alignment aperture of the management spool and to align the separator within the housing.

2. The optical module of claim 1, wherein the at least one alignment aperture forms a notch extending from a base of the housing and continuing partially along a circumference of the management spool.

3. The optical module of claim 1, wherein the at least one alignment aperture continues from an outer diameter of the management spool through an inner diameter of the management spool.

4. The optical module of claim 1, wherein the management spool has a plurality of alignment apertures, and wherein the separator has a corresponding plurality of alignment tabs.

5. The optical module of claim 4, wherein the plurality of alignment apertures are evenly spaced about a circumference of the management spool.

6. The optical module of claim 1, wherein the at least one alignment tab is integral to the separator.

7. The optical module of claim 1, wherein the at least one alignment tab is at least partially retained within the interior of the housing by the engagement between the at least one alignment tab and the at least one alignment aperture.

8. An optical module comprising:
a housing defining an interior;
an optical adapter arrangement disposed at the housing, the optical adapter arrangement having inner ports accessible from the interior of the housing and outer ports accessible from an exterior of the housing;
a cable inlet leading from the exterior of the housing to the interior of the housing, the cable inlet being configured to receive an optical cable including a plurality of optical fibers;
a splice location disposed within the interior of the housing;
a plurality of optical pigtails extending from unterminated ends to connectorized ends, the unterminated ends being disposed at the splice location, the connectorized ends being plugged into the inner ports of the optical adapter arrangement;
a support ring disposed within the interior of the housing, the support ring not being sufficiently high to provide bend radius protection for the plurality of optical pigtails; and
a separator disposed within the interior of the housing and resting on the support ring, the separator disposed over a portion of the optical pigtails extending from the inner ports of the optical adapter arrangement.

9. The optical module of claim 8, wherein the support ring is at least as high as the diameter of one of the optical pigtails.

10. The optical module of claim 8, wherein the support ring is at least as high as the combined diameter of two of the optical pigtails.

11. An optical module comprising:
a housing defining an interior;
an optical adapter arrangement disposed at the housing;
a cable inlet leading from an exterior of the housing to the interior of the housing, the cable inlet being configured to receive an optical cable including a plurality of optical fibers;
a splice location disposed within the interior of the housing;
a plurality of optical pigtails extending from unterminated ends to connectorized ends, the unterminated ends being disposed at the splice location;
a separator disposed within the interior of the housing, the separator disposed over a portion of the optical fibers;
guide fingers disposed between the splice location and the optical adapter arrangement, the guide fingers being sufficiently spaced to enable the plurality of optical pigtails to pass therebetween, the guide fingers extending through holes of the separator to align the separator with the housing; and
a splice component disposed within the interior of the housing over the separator at the splice location.

12. The optical module of claim 11, wherein the splice component is a removable splice tray.

13. The optical module of claim 11, wherein the splice component is a splice chip.

14. The optical module of claim 11, wherein the splice component is configured to receive a mass fusion splice.

15. The optical module of claim 11, wherein the splice component has a bend radius limiting arrangement.

16. The optical module of claim 11, wherein the guide fingers extend past the separator when the separator is positioned in the housing.

17. The optical module of claim 11, wherein the guide fingers are monolithically formed with a base of the housing.

18. The optical module of claim 11, wherein the guide fingers are arranged in a curved path along the housing.

19. The optical module of claim 11, wherein there are at least two guide fingers.

20. The optical module of claim 11, wherein there are six guide fingers arranged in a curved path.

* * * * *